United States Patent Office 3,343,739
Patented Sept. 26, 1967

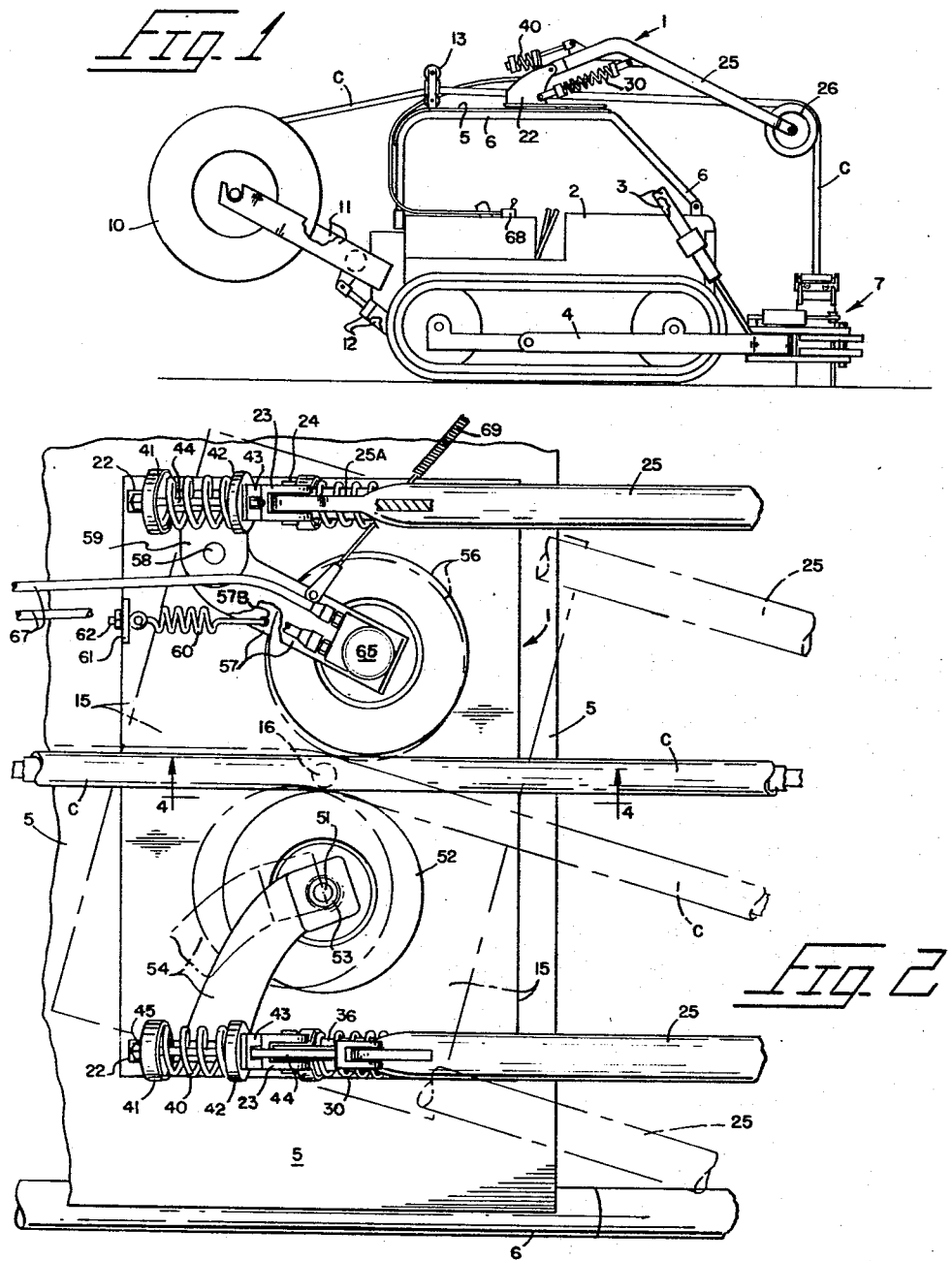

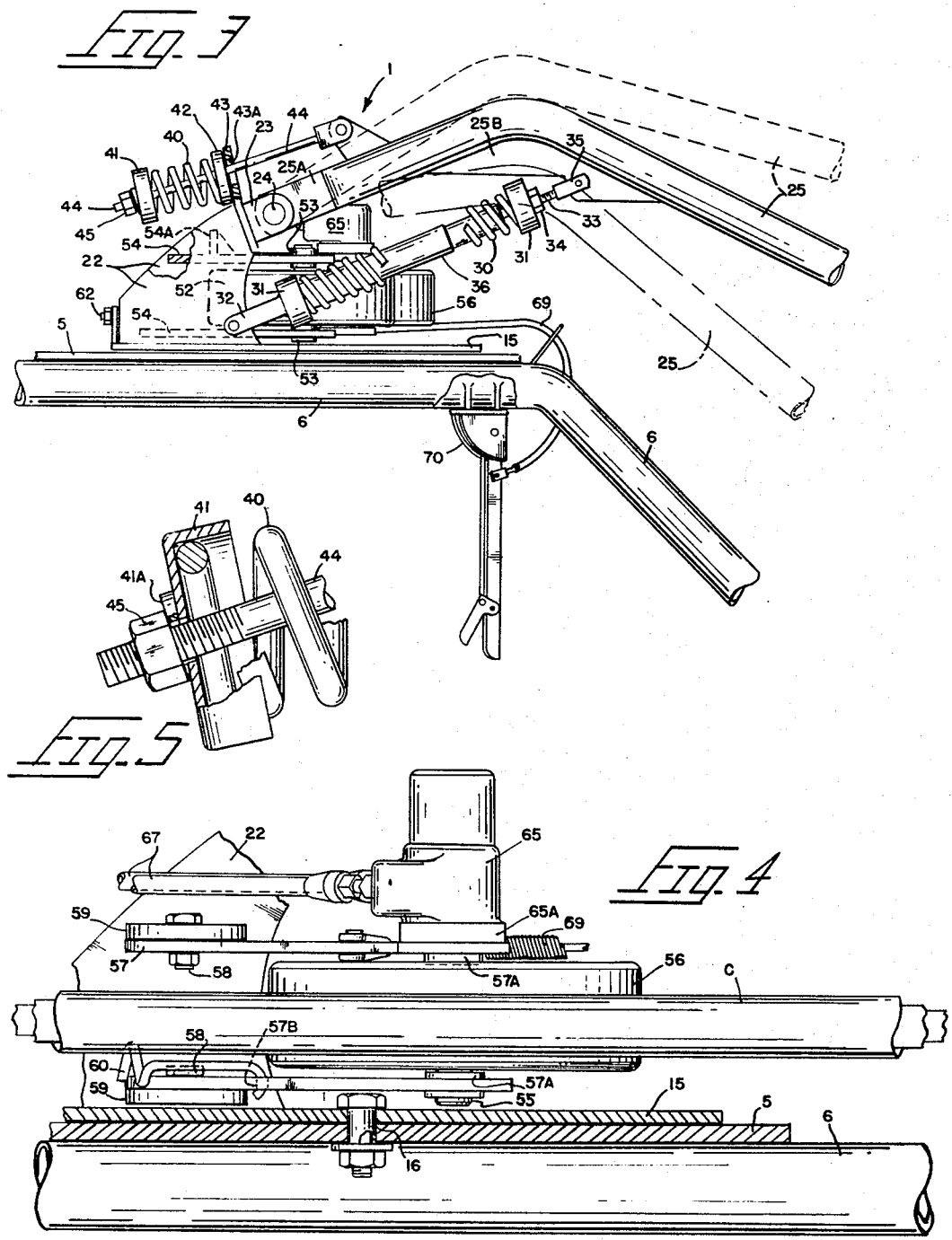

1

3,343,739
POWER ACTUATED CABLE FEED AND
TENSIONING MECHANISM
Frank R. Kinnan, Camas Valley, Oreg., assignor to
Henkels and McCoy, Inc., Blue Bell, Pa., a corporation
of Pennsylvania
Filed Oct. 24, 1965, Ser. No. 504,834
8 Claims. (Cl. 226—187)

This invention relates to cable or conduit delivering means primarily for use in conjunction with a tractor mounted cable laying plow and more particularly to an apparatus providing means for the controlled unreeling of cable including cooperating tensioning means for the unreeled cable.

An important object of this invention is the provision of tractor mounted, power driven means for the controlled unreeling of electrical cables or other flexible conduits from drums or reels rotatably mounted upon the tractor. The reels by reason of their considerable size and weight are unwieldly and the paying out or unreeling of the cable therefrom presents a problem by reason of the reels considerable inertia. In a typical cable or conduit laying operation the inertia of the reel as well as its continued rotation has for the most part been by the manual efforts of one or two men stationed adjacent the reel. The inertia of a static drum or reel as a cable laying operation is started can result in costly internal breaks or ruptures in the cable by the sudden tension loads applied thereto. Such damage to a coaxial telephone cable is particularly undesirable since the repair thereof involves a substantial man hour effort and is costly. With this in mind the instant invention allows the operator of a cable laying tractor to selectively initiate, control and terminate the unreeling of cable or conduit in a planned and precise manner.

Another important object of this invention is the provision of self positioning arms provided with a cable or conduit sheave for locating the latter directly over a cable burying plow allowing the cable to enter the plow substantially in vertical alignment therewith. In present cable laying operations the cable plow is usually located at various distances transversely from the centerline of its supporting tractor or vehicle requiring cable being laid thereby to be entrained over various roller and sheave arrangements. Such entrainment of the cable thereover becomes particularly critical where larger diameter cable, up to five inches, is involved since the minimum acceptable radius of turn for such cable is of considerable magnitude and turns on a lesser radius are prohibited by reason of the resulting cable damage. In conjunction with this object is the tensioning feature provided by the pair of forwardly extending, biased arms which permits a cable sheave to move within a vertical plane exerting a more or less constant force against the cable.

A further object is the provision of controls by which the linear speed of the cable may be varied and additional means by which the drive assembly may be completely disengaged from the cable or conduit.

These and other objects will become subsequently apparent upon a reading of the specification in conjunction with the drawings referred to therein and in which;

FIGURE 1 is a side elevational view of a tractor provided with the present invention and carrying at its forward end a cable laying plow for the burying of a continuous cable at a predetermined depth below the ground surface.

FIGURE 2 is a fragmentary, plan view of the present invention with parts broken away for purposes of illustration.

FIGURE 3 is a side elevational view of the present invention as shown in FIGURE 2.

2

FIGURE 4 is a vertical sectional view on an enlarged scale taken along line 4—4 of FIGURE 2 showing drive means for the cable.

FIGURE 5 is a detailed, fragmentary view of adjustment means for the spring units associated with the arms.

With continuing reference to the drawings and particularly FIGURE 1 thereof, indicated generally at 1 is the subject apparatus of the present invention in place upon a track laying vehicle indicated generally at 2 provided with the usual side mounted hydraulic lifting cylinders 3 and push frame member 4 positionable thereby. The vehicle includes a superstructure in the form of a cab roof 5 and an upright tubular supporting structure therefor as at 6. A cable laying plow assembly is indicated generally at 7 mounted along the forward end of the push frame member 4. The cable plow 7 is the subject of a separate application entitled Oscillatory Ground Engaging Tooth to be filed concurrently with this application.

A supply of cable or conduit is provided by a reel 10 the latter being removably journalled in a freely rotatable manner near the rearward end of a pair of upwardly extending supports 11. The supports are swingably mounted at their forward ends to the vehicle and are positioned within a vertical plane by a second pair of hydraulic cylinders indicated at 12. The cylinders 12 when retracted facilitate the loading of a reel onto the supports 11 for subsequent movement into the operational position of FIGURE 1.

A run of entrained cable or conduit is indicated at C which from reel 10 progressively encounters guides 13 in the form of rollers, the cable delivering apparatus 1 of the present invention, and finally cable laying plow 7 for downward travel therethrough.

With particular regard to the apparatus 1, as best shown in FIGURES 2 and 3, a base is indicated at 15 in the form of a rectangular plate centrally pivoted by a sleeve bearing 16 to the cab roof 5 for swinging, horizontal movement relative thereto as shown in broken lines in FIGURE 2. Periodic applications of lubricant to the upper surface of the cab roof 5 subjacent the base facilitates movement of the base to locate cable tensioning means in vertical spaced relationship to a cable plow mounted on the vehicle in an offset manner.

Welded or otherwise suitably secured adjacent each side of base 15 near the rearward end thereof are upright plate members 22 each of which is provided at their upper ends with a clevis plate 23. Cable tensioning means are provided in the form of a pair of forwardly extending, angular arms 25 swingably mounted by pins 24 in each of the clevis plates 23. The arms 25 converge to support at their forward end a sheave 26 journalled therebetween. Arms 25 may be of tubular stock and flattened as at 25A or otherwise provided with a bearing surface through which pins 24 extend providing a horizontal axis about which the arms 25 may travel as hereinafter described.

Spring biasing means associated with each of the arms for vertically positioning the same is provided in the form of pairs of coil spring units indicated at 30 and 40 best shown in FIGURE 3. With regard to one of the coil spring units 30, subjacent the arms 25, an elongated compression coil spring is confined within cup shaped members 31 the rearward one of which is provided with a clevis type fitting 32 which straddles and is pivotally attached to the plate member 22. The forward cup member is retained by means of a nut 34 along a threaded shaft 33 the latter being integral with a commercially available hydraulic shock absorber unit 36. Threaded shaft 33 is pivotally connected by another clevis fitting 35 to a stiffener plate 25A welded to the underside of arm 25. The lower end of the shock absorber unit 36 is securely held within the lower cup member 31 along with the corresponding end of the coil spring. From the above it is apparent that downward movement of the arms 25 resulting from increased tension loading of cable C is resisted by the coil spring units 30 with the automotive type shock absorber acting to inhibit the spring urged motion of the arms in the opposite direction.

The remaining pair of coil spring units indicated at 40, disposed above the arms 25, each include a compressed coil spring confined within cooperating cup shaped members 41 and 42 with the latter members fixedly secured to an upright angular support 43. Each of the angular supports 43 is provided with a lengthwise, elongated opening 43A through which a push rod 44 extends terminating in a threaded portion 44A provided with a retainer nut 45 for securing the cup member 41 against the spring in any desired bearing relationship. Inclined bearing surfaces 41A are formed integral with the outer wall of cup member 41 to enable the nut 45 to bear thereagainst in a surface to surface manner.

From the foregoing it will be seen that the cable tensioning means in the form of the forwardly and downwardly extending arms 25 acting through sheave 26 locate the traveling cable C in vertical alignment with the cable laying plow. As previously mentioned the desired turning radius of large coaxial cable can be conveniently provided by the sheave 26. If desired the sheave 26 may be replaced to suit the size of cable being laid.

The tensioning means described, provides a means for supporting a traveling cable under a slight tension load regardless of momentary changes in the linear speed of the cable or in the speed of the vehicle 1.

Indicated generally at 50 is a powered cable feed apparatus constituting a part of the present invention, for advancing cable along a linear path in a controlled manner from its reel 10 to the cable plow 7 for subsequent entrenchment at a desired distance below the surface of the ground.

The cable feeding apparatus 50 is carried by the base 15 and specifically by the pair of upright plate members 22. More particularly the apparatus comprises an idler wheel 52 the axle 51 of which is journalled within lower and upper arms 54 within bearings 53 to provide a fixed vertical axis for the wheel. The arms 54 are secured as by welding to the inside surface of one of the lower plate members 22 as viewed in FIGURE 2. A gusset 54A is for arm reinforcement purposes.

A cable drive wheel indicated at 56 is carried by an axle 55 journalled within a pair of bearings 57A in upper and lower supporting arms 57 each swingably attached by vertically aligned pins 58 to inwardly projecting, horizontal plates 59 welded to the inner surfaces of the plate member 22. Intermediate the pivoted end and the wheel end of the lower supporting member 57 is an aperture 57B for the reception of one end of a tension spring 60 secured at its opposite end to a clip 61 by an eye bolt 62. The wheel 56 as well as wheel 52 are preferably of the pneumatic type.

In direct driving engagement with the axle 55 of wheel 56 is a vertically disposed hydraulic motor 65 secured by its base 65A to the end of the upper supporting arm 57. A pair of hydraulic lines 67 provide communication of the motor 65 with a source of pressurized fluid through ordinary valve metering means 68 positioned within and controlled from the vehicle operator's station (FIGURE 1). Since vehicles of the type shown normally include a source of hydraulic pressure it requires but a simple modification to provide a suitable hydraulic circuit including the valve means 68 for controlling the speed of the motor and hence the linear speed of the driven cable.

While the cable feed apparatus 50 is shown and described as being carried by the pivotally mounted base 15 it is practical in some applications to disassociate the two and mount the arms 54 and plates 59 to the cab roof 5 of the vehicle.

From the above it is apparent that the spring 60 will bias the wheel 56 in a horizontal and rearward direction about the vertical axis of pins 58 into friction driving engagement with the cable C against idler wheel 52. For movement of the wheel 56 in an opposite direction, into a completely disengaged position, a flexible sheathed wire 69 is provided connected at one end to the lower bracket of the pair of brackets 57 and terminating at its other end in a ratchet lever arrangement 70 within the cab of the vehicle.

The operation of the cable delivery apparatus is as follows. With the cable supply reel 10 rotatably mounted in place on the supports 11 a length of cable is manually unwound of sufficient length for biased engagement with wheels 52–56. Motor 65 through valve 68 is energized to unreel an additional length of cable from the drum sufficient for entrainment over sheave 26 and to extend downward to the cable laying plow 7 terminating at the lower end thereof within a trench cut thereby.

As the cable laying operation is begun by the forward movement of the vehicle 2 the operator coordinates the linear speed of the cable by motor 65 through the valve means 68 with the forward speed of the cable laying plow to provide very slight tensioning of the run of cable from the sheave downward to the plow. At the optimum the sheave 26 will be vertically positioned intermediate the limits of travel of arms 25 such as is shown in FIGURE 1 by a slight downward force exerted by the cable indirectly against the coil spring units 30 and 40.

Changes in vehicular speed or in the speed of the cable feed will cause the arms 25 and sheave 26 to momentarily reposition themselves until the speeds of the cable feed and vehicle are synchronized. For most all purposes once the speeds are so synchronized they will not require adjustment. The apparatus 1 is automatically positioned horizontally about bearing 16 to locate the sheave 26 over a plow 7 mounted in an offset manner by the tension exerted on the cable as the plow advances.

While I have shown a particular form of embodiment of my invention, I am aware that many minor changes therein will readily suggest themselves to others skilled in the art without departing from the spirit and scope of the invention. Having thus described my invention, what I claim as new and desire to protect by Letters Patent is:

1. Apparatus for the controlled unreeling of cable or conduit from a storage reel providing a continuous and properly tensioned run thereof to a cable burying plow carried by a mobile unit, said apparatus comprising:
    cable feed means carried by said unit in engagement with the cable for powering the latter in a linear direction including control means whereby the linear speed of the cable driven thereby may be regulated,
    cable guide and tensioning means carried by said mobile unit in a resilient manner and in engagement with the cable intermediate said feed means and said plow whereby momentary changes in either the cable speed or mobile unit speed will result in said guide means automatically repositioning to properly tension the run of the cable adjacent the cable plow.

2. Apparatus for the controlled unreeling of cable or conduit from a storage reel to provide a continuous and properly tensioned run thereof to a cable burying plow carried by a mobile unit, said apparatus comprising:
    cable feed means carried by said unit including drive means in frictional engagement with said cable,
    a base pivotally mounted on said mobile unit for movement in a horizontal plane,
    rotatable guide means receiving the cable intermediate said feed means and said cable burying plow,
    arm means supporting at one of its ends said guide means and at its opposite end swingably carried by said base in a manner permitting movement about a horizontal axis, and
    resilient means coupled with said arm means for urging the latter and said rotatable guide means carried thereby in an upward direction to tension that run of cable between the rotatable guide means and the cable laying plow.

3. Apparatus carried by a mobile unit for unreeling and tensioning of flexible cable or conduit prior to its downward passage through a cable burying plow carried by said unit for placement within a trench cut by the plow, said apparatus including a pivotally mounted base carried by said mobile unit and adapted for movement in a horizontal plane, cable feed means carried by said base and in bearing engagement with said cable for driving the latter in a linear direction, elongated cable support means hingedly carried by said base for movement relative to said base about a horizontal axis, rotatable guide means carried at one end of said support means and in supporting engagement with a portion of the cable intermediate said feed means and the cable plow, resilient means coupled with said base and said elongated cable support means for exerting an upward force on the latter whereby the run of cable immediately above the cable plow is properly tensioned.

4. The apparatus as claimed in claim 3 wherein said cable feed means includes a pair of cooperating rotatably mounted members and means mounting said members on said base in a manner permitting disposition of one member relative to the remaining member for the reception therebetween of cables of varying diameters.

5. The apparatus as claimed in claim 4 wherein said cable feed means further includes a motor in driving engagement with one of said rotatable members and spring biasing means associated with at least one of said rotatable members urging the latter into contact with the cable.

6. Apparatus carried by a mobile unit for the unreeling and tensioning of flexible cable or conduit prior to its downward passage through a cable burying plow carried by said unit for placement within a trench cut by the plow, said apparatus including, a pivotally mounted base carried by said mobile unit and adapted for movement about a vertical axis, cable feed means carried by said base including rotatable members and a motor in driving engagement with one of said members, elongated cable support means carried by said base and adapted for movement about said vertical axis, means hingedly attaching said support means to said base permitting movement of the support means about a horizontal axis, rotatable guide means carried at one end of said support means and in supporting engagement with a portion of the cable intermediate said feed means and the cable plow, coil spring units coupled with said elongated support means and biasing the latter towards a raised position in opposition to the variable downward force exerted on the traveling cable by the cable plow whereby momentarily changes in the tension exerted on the cable will be absorbed to a large extent by the vertical repositioning of the elongated cable support means and the cable guide means carried thereby.

7. The apparatus as claimed in claim 6 wherein said coil spring units include adjustment means for varying the loading thereof.

8. Apparatus carried by a mobile unit for tensioning of flexible cable or conduit prior to its downward passage through a cable burying plow carried by said unit for placement within a trench cut by the plow, said apparatus comprising, a pivotally mounted base carried by said unit and adapted for swinging movement in a horizontal plane, elongated cable support means hingedly carried by said base for movement relative to said base about a horizontal axis, rotatable guide means carried at one end of said support means and in supporting rolling engagement with a portion of the cable prior to its downward passage through the cable plow, and resilient means coupled with said base and said cable support means exerting an upward force on the latter whereby the run of cable immediately above the cable plow is properly tensioned.

References Cited

UNITED STATES PATENTS

| 3,037,357 | 6/1962 | Knapp et al. | 61—72.6 |
| 3,173,272 | 3/1965 | Knapp et al. | 61—72.6 |
| 3,175,368 | 3/1965 | Tibbits | 61—72.6 |
| 3,203,188 | 8/1965 | Evans | 61—72.6 |
| 3,232,358 | 2/1966 | Heiberg | 61—72.6 |

FOREIGN PATENTS 937,655  1/1956  Germany.

M. HENSON WOOD, Jr., *Primary Examiner.*

ALLEN N. KNOWLES, *Examiner.*